Patented Jan. 15, 1935

1,988,205

UNITED STATES PATENT OFFICE 1,988,205

VAT DYESTUFFS OF THE DIBENZOPYRENE-QUINONE SERIES

Max Albert Kunz, Mannheim, Georg Kränzlein, Frankfort-Hochst-on-the-Main, Karl Koeberle, Ludwigshafen-on-the-Rhine, Martin Corell, Frankfort-Hochst-on-the-Main, Erich Berthold, Ludwigshafen-on-the-Rhine, and Heinrich Vollmann, Frankfort-Hochst-on the-Main, Germany, assignors to General Aniline Works, Inc., New York, N. Y., a corporation of Delaware No Drawing. Original application April 16, 1929, Serial No. 355,654. Divided and this application August 31, 1932, Serial No. 631,303. In Germany June 30, 1928

10 Claims. (Cl. 260—61)

The present invention relates to new vat dyestuffs of the dibenzopyrenequinone series and a method for their production.

It is already known that halogen can be introduced in 3,4,8,9-dibenzopyrene-5,10-quinone by means of halogens or halogenating agents with or without the aid of halogen transferrers. Some of the halogen derivatives thus obtained are themselves vat dyestuffs and others are valuable intermediate products for the manufacture of dyestuffs. All these products, however, in so far as they are dyestuffs at all, are not very suitable for dyeing purposes in practice, because they dye rather dull shades which, moreover, are not sufficiently fast. It is also known that uniform 1,6-dichloro-3,4,8,9-dibenzopyrene-5,10-quinones are obtained by treating 1,5-dibenzoyl-2,6-dihydroxy-naphthalene with phosphorus chloride. The resulting dyestuffs have dyeing properties similar to those of the unsubstituted 3,4,8,9-dibenzo-pyrene-5,10-quinone, which, though they are valuable in many respects, do not meet all requirements of practice.

In our copending application Ser. No. 355,654, filed April 16, 1929, of which this application is a division, we have disclosed that new products, containing halogen and having excellent dyeing properties, are obtained by treating 3,4,8,9-dibenzopyrene-5,10-quinone, which initial material corresponds to the formula

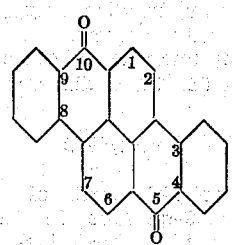

in sulphuric acid or derivatives thereof, such as fuming sulphuric acid and in particular chlorsulphonic acid, with halogens or agents supplying the same in the presence of a halogen-transferring catalyst under such conditions of working as to prevent an undue attack of the initial material and the final product. It has been found that these conditions of working depend largely on the temperature employed. The temperature may be the lower, the more reactive the halogen is; therefore, in the case of chlorine, it may be as low as 50° C., whereas in the case of bromine it will usually be about 60° C., and in the case of iodine still higher temperatures, such as 110° C. and more will be necessary. It has also been found that at higher temperatures, say at about 80° to 85° C. or more, the 3,4,8,9-dibenzopyrene-5,10-quinone is not entirely resistant to the action of the sulphuric acids employed, these giving rise to the formation of sulphonated products and other by-products impairing the properties of the final product. It is, however, possible to carry out the reaction at such high temperatures, provided it is completed in as short a time as possible, whereby the said action of the sulphuric acids is avoided. With this object in view, either an addition of comparatively large quantities of the halogen-transferring catalyst, such as iodine or sulphur may be made, or the halogen is rapidly introduced into the reaction mixture, or an excess thereof employed, or several of these measures may be used. It results from the foregoing that the most favorable temperature is not higher than about 80° or 85° C. in the case of bromination or chlorination; when working below the said limit, small quantities of the catalyst, for example 0.1 to 0.5 per cent by weight, calculated on the amount of the dibenzopyrene-quinone, are sufficient for the production of products dyeing clear yellow shades; if, however, products possessing the most desirable shades and the highest coloring power are to be made, it is advisable to employ considerably larger amounts of the catalysts. Valuable products are also obtained at higher temperatures, in which case one or more of the aforesaid precautions must be taken; for instance, the amount of catalyst employed may be as high as 2, 3, 5 or still much more per cent by weight, calculated on the dibonzopyrene-quinone. It will be seen that the conditions of working are mutually interdependent; they must be so restricted as to time or temperature and so on, that no sulphonation or other undesirable change of the initial materials occurs; for the sake of simplicity of language, we shall therefore speak in the following of "restricted conditions", and it will now be understood what we mean by this term. In order to make the matter still clearer, we shall now explain our method by reference to a typical case, namely the production of dibromo-3,4,8,9-dibenzopyrene-5,10 - quinone. When 3,4,8,9-dibenzopyrene-5,10-quinone is dissolved, for example in chlorsulphonic acid, and acted upon with bromine, the reaction may be carried out with 1 to 1.25 molecular proportions of bromine per each molecular proportion of the dibenzopyrene-quinone with the aid of from 2 to 10 per cent of a catalyst, such as iodine, and in the course of only a few hours at temperatures of about 80° C., a dibrominated product of highest qualities being obtained. When working at lower temperatures, such as from 60° to 70° C. a larger amount of bromine and a prolonged time of reaction, for example 20 hours or even more, is suitable. At higher temperatures of for example 85° to 100° C. the time of reaction must be reduced to a minimum, and preferably agents counteracting sulphonation, such as iodine or sulphur are added. At still higher temperatures, still more precaution is necessary. Further typical cases of the restricted conditions will be given hereinafter in the examples.

As pointed out in the foregoing, the reaction may be carried out in sulphuric acid or derivatives thereof, such as fuming sulphuric acid and in particular chlorsulphonic acid. When hereinafter we speak of "sulphuric acid solution", we wish it to be understood that this term is also to cover solutions in the derivatives of sulphuric acid. It should be noted that chlorosulphonic acid is a particularly good solvent for the purposes of our present invention. When employed at high temperatures, such as about 85° C. or above, chlorination may take place to a smaller or greater extent due to the action of the chlorosulphonic acid.

halogen and of the known 1,6-dichloro-3,4,8,9-dibenzopyrene-5,10-quinone; also their properties as regards fastness are much better than those of the said known products; they are particularly distinguished by their excellent fastness to light and to boiling with solutions of soap or soda, and they also possess a very good affinity to vegetable fibre. Particularly valuable products obtainable according to the present invention are those containing from two to three bromine atoms in the 3,4,8,9-dibenzopyrene-5,10-quinone molecule. They give particularly bright, clear dyeings, and are also very readily vatted.

Generally speaking, it is of no importance, whether crude or pure 3,4,8,9-dibenzopyrene-5,10-quinone is used as starting material, but it may in some cases be of advantage to employ a pure initial material, because in this case the final products are particularly free from impurities which might cause trouble in their application for dyeing, though as a rule the impurities are insoluble in the vats. Such impurities may, however, also be removed by purifying the products obtained from crude initial material.

The constitution of the new products is not yet known with certainty, whereas the number of halogen atoms contained in the substituted molecule is definitely known. In the annexed more detailed description the products are given in the following examples, whole and fractional numbers ($1\frac{1}{2}$) are used to represent the mean content of the halogens in the molecule. The examples are to be in no way restricted. The parts are by weight.

*Example 1*

10 parts of 3,4,8,9-dibenzopyrene-5,10-quinone are added to 400 parts of chlorosulphonic acid at a temperature of approximately 15° to about 20° C. At this stage about 10 parts of bromine are added. The whole is allowed to react for about 18 to 20 hours at this temperature until no further addition of bromine is observed. The whole is worked up by diluting with 10 parts of water and adding sulphuric acid, or pouring on to a mixture of ice and water. The 3,4,8,9-dibenzopyrene-5,10-quinone containing 1.5 atoms of bromine is obtained by filtration. The whole is washed with dilute sulphuric acid producing a violet coloration, and by vatting a reddish yellow vat with a bluish fluorescence which produces a very good fastness to a reddish violet-red.

When working under similar conditions at a temperature of about 60° to 65° C. a bromine derivative is obtained.

*Example 2*

A solution of 12.5 parts of 3,4,8,9-dibenzopyrene-5,10-quinone in 250 parts of chlorosulphonic acid is heated slowly at first to a temperature of 60° or 80° C. and then to 100° parts of bromine is introduced at a temperature of 85° to 100° C. and this temperature is maintained for at least 20 hours until the major portion of the bromine is absorbed. The whole is then worked up as indicated above. The dyestuff, a 3'-dibromo-3,4,8,9-dibenzopyrene-5,10-quinone, contains about 3 atoms of bromine is obtained. It dyes cotton from a sulphuric acid bath to give a violet coloration and crystallizes from nitrobenzene in orange needles which increase in their lustre. It gives extremely bright reddish yellow-reddish violet dyeings of extremely good fastness in absence of a pink and reddish tint, increasing the doses of pink in the dyestuff.

initial material from 2 to 2½ times as regards color strength.

Dyestuffs having similar dyeing properties, but containing more bromine, are obtained by employing larger quantities of bromine.

When using mercury instead of iodine as a catalyst, a product dyeing similar shades is obtained.

Example 3

33.2 parts of 3,4,8,9-dibenzopyrene-5,10-quinone are dissolved while stirring in 350 parts of 12 per cent oleum and after the addition of 3 parts of iodine, are treated with 100 parts of bromine. The temperature is then raised to from 65° to 70° C. and maintained thereat until the bulk of the bromine is absorbed. After cooling, the product is worked up in the usual manner. The dyestuff, obtained as an orange yellow powder, which is a dibromo-3,4,8,9-dibenzopyrene-5,10-quinone, dissolves in concentrated sulphuric acid to give a violet coloration and gives dyeings similar to those of the dyestuff prepared according to Example 2.

By employing antimony, sulphur or selenium instead of iodine as the catalyst in the above example, products of similar fastness properties but giving somewhat less reddish dyeings are obtained.

Example 4

33.2 parts of 3,4,8,9-dibenzopyrene-5,10-quinone are dissolved in 332 parts of chlorsulphonic acid and, at about 16° to 20° C., 2 parts of iodine and 8.8 parts of bromine are added, while stirring. The temperature is then raised to from 65° to 70° C., and the mixture is stirred, until the whole of the bromine is absorbed. After cooling, the product is worked up in the usual manner. The resulting $\beta$-monobromo-3,4,8,9-dibenzopyrene-5,10-quinone, an orange yellow powder, crystallizes from high boiling solvents in fine orange red needles, dissolves in concentrated sulphuric acid with the formation of a violet solution and gives very fast yellow dyeings with a reddish tinge on cotton from a red vat with a blue tinge.

Example 5

33 parts of pure 3,4,8,9-dibenzopyrene-5,10-quinone (obtainable, for example, by sublimation of crude 3,4,8,9-dibenzopyrene-5,10-quinone) are dissolved in 330 parts of chlorsulphonic acid, while stirring. 1.65 to 2.3 parts of iodine are then added, 20 parts of bromine are run in at room temperature, and then the temperature is slowly raised to from 70° to 80° C. As soon as the bulk of the bromine is absorbed, the solution is allowed to cool, diluted with 200 parts of concentrated sulphuric acid, poured onto ice, and the acid paste is then boiled for a short time by introducing steam and filtered by suction. The resulting dibromo-3,4,8,9-dibenzopyrene-5,10-quinone probably contains the bromine atoms in the $\beta$- and $\beta'$-positions; it possesses tinctorial properties similar to those of the dyestuff obtainable according to Example 2, after the same has been recrystallized.

If a 3,4,8,9-dibenzopyrene-5,10-quinone purified by crystallization be employed instead of sublimated 3,4,8,9-dibenzopyrene-5,10-quinone, a dyestuff is obtained, which possesses similar tinctorial properties.

The same dyestuff is obtained by employing 3 parts of mercury as a catalyst, 40 parts of bromine and heating to about 60° to 70° C. only.

Example 6

33.2 parts of pure 3,4,8,9-dibenzopyrene-5,10-quinone, (prepared, for example, from the oxonium salt separating from the sulphuric acid solution of the dibenzopyrenequinone) in 332 parts of chlorsulphonic acid are mixed, while stirring, with 40 parts of bromine at about 16° to 20° C. after the addition of 1.6 parts of iodine. The mixture is then slowly warmed to about 85° C. and kept at this temperature until a sample of the reaction product dissolves in concentrated sulphuric acid with the formation of a violet solution. The reaction product is then worked up in the usual manner. The resulting dyestuff, $\beta,\beta'$-dibromo-3,4,8,9-dibenzopyrene-5,10-quinone, which is an orange red powder dyes cotton from a red vat strong yellow orange shades of an excellent fastness.

A dyestuff of a slightly more yellowish shade is obtained by employing instead of 1.6 parts of iodine the same amount of sulphur or mercury or bismuth as a catalyst.

Example 7

33.2 parts of pure 3,4,8,9-dibenzopyrene-5,10-quinone obtainable by boiling the crude product with organic solvents, such as nitrobenzene or trichlorbenzene, are heated to 85° to 90° C. in 320 parts of chlorosulphonic acid, while stirring after adding 0.35 part of iodine. Thereupon 25 parts of bromine are run in and stirring is continued until the bulk of the bromine has been taken up. After cooling, the reaction product is worked up in the usual manner. The resulting dibromo-3,4,8,9-dibenzopyrene-5,10-quinone, which also contains a little chlorine, is a yellow orange powder and dyes somewhat yellower shades than the dyestuff obtained according to Example 5 which dyes otherwise with quite similar properties.

Example 8

33.2 parts of pure 3,4,8,9-dibenzopyrene-5,10-quinone are dissolved while stirring in 300 parts of sulphuric acid containing 23 per cent of sulphur trioxide and slowly heated to between 110° and 115° C. after the addition of 3 parts of iodine and 40 parts of bromine. After the bulk of the bromine has been consumed, the reaction mixture is allowed to cool and worked up as usual. The dyestuff of which an excellent yield is obtained, is a tetrabromo-3,4,8,9-dibenzopyrene-5,10-quinone according to analysis, forms an orange powder when dry, crystallizes in fine needles from nitrobenzene, dissolves to a blue solution in concentrated sulphuric acid and dyes cotton strong orange shades from a violet red vat.

Dyestuffs of similar tinctorial properties are obtained by employing as catalyst 0.3 part of mercury or sulphur instead of iodine.

Example 9

66 parts of 3,4,8,9-dibenzopyrene-5,10-quinone are dissolved at room temperature in 660 parts of chlorosulphonic acid, while stirring. After adding 4 parts of iodine and 1 part of mercury, 100 parts of bromine are run in slowly, whereupon the temperature is raised to 70° C. The mass is stirred at the said temperature until the bulk of the bromine has been taken up, allowed to cool and worked up in the usual manner. The resulting product, of which an excellent yield is obtained, is a tribromo-3,4,8,9-dibenzopyrene-5,10-quinone containing bromine in the β, β'-positions, constituting an orange powder dissolving to a blue solution with a violet tinge in concentrated sulphuric acid and dyeing from a blue-red vat bright orange shades.

Example 10

44 parts of 3,4,8,9-dibenzopyrene-5,10-quinone are dissolved in 400 parts of oleum containing 23 per cent of $SO_3$, whereupon 1 part of antimony and 1 part of sulphur and then 35 parts of bromine are added while stirring. The temperature is then raised to between 65° and 70° C., and the mass is stirred at the said temperature, until all bromine has been taken up, then allowed to cool and worked up in the usual manner. The resulting tribromo-3,4,8,9-dibenzopyrene-5,10-quinone dyes more yellowish orange shades than the product described in Example 9, which is probably an isomeric compound.

Example 11

33.2 parts of 3,4,8,9-dibenzopyrene-5,10-quinone are dissolved in 300 parts of sulphuric acid containing 23 per cent of sulphur trioxide and heated, while stirring, after the addition of 3 parts of iodine and 36 parts of bromine to between 65° and 70° C. After all of the bromine has been taken up, the reaction mixture is allowed to cool, diluted if desired with 300 parts of concentrated sulphuric acid, poured into ice-cold water, the reaction product filtered by suction, washed, if desired, with a small amount of a diluted solution of soda and then washed again with water until neutral. The tetrabromo-3,4,8,9-dibenzopyrene-5.10-quinone, an orange paste with a reddish tinge, is an orange powder when dry dissolving to a blue solution in concentrated sulphuric acid, and dyes cotton from a blue vat orange shades.

Example 12

33.2 parts of 3,4,8,9-dibenzopyrene-5,10-quinone are introduced into a stirred solution of 50 parts of bromine and 3 parts of iodine in 300 parts of chlorosulphonic acid. Thereupon the temperature is raised to between 65° and 70° C., stirring being continued for several hours at the said temperature which is then raised to between 70° and 75° C. until a sample of the reaction product dissolves to a violet blue solution in concentrated sulphuric acid. The reaction mixture is then allowed to cool and worked up as usual. The tribromo-3,4,8,9-dibenzopyrene-5,10-quinone containing bromine in the β, β-positions obtained in the form of an orange paste dyes cotton from a violet red vat strong brilliant golden orange shades of excellent fastness.

Example 13

33.2 parts of pure 3,4,8,9-dibenzopyrene-5,10-quinone are dissolved while stirring in 300 parts of chlorosuphonic acid after the addition of 0.3 part of iodine and 40 parts of bromine. The temperature is slowly raised to between 65° and 70° C. which temperature is maintained until a sample of the reaction product dissolves to a violet blue solution in concentrated sulphuric acid. The reaction mixture is then allowed to cool and worked up as usual. The bromination product, a dibromo derivative according to analysis, dyes cotton from a blue red vat shades which are essentially more yellowish than those obtained from the dibromo derivative described in Example 5.

Other halogen carriers may be used instead of iodine.

What we claim is:—

1. The vat dyestuffs consisting substantially of 3,4,8,9-dibenzopyrene-5,10-quinones containing from 2 to 3 atoms of bromine per molecule of which at least one is in a β-position, and no other substituent, which form orange powders and dye cotton from violet to red vats substantially more reddish yellow shades than 3,4,8,9-dibenzopyrene-5,10-quinone, dissolve in concentrated sulphuric acid with a blue to violet coloration, are difficultly soluble in organic solvents of high boiling point, and are distinguished from 3,4,8,9-dibenzopyrene-5,10-quinone by having a substantially greater coloring power and by a substantially greater fastness to light and to boiling with solutions of soap and soda.

2. Dibrominated 3,4,8,9-dibenzopyrene-5,10-quinones containing at least one bromine atom in a β-position which dye cotton from violet red vats substantially more reddish yellow shades than 3,4,8,9-dibenzopyrene-5,10-quinone dissolve in concentrated sulphuric acid with a violet coloration are difficultly soluble in organic solvents of high boiling point, and are distinguished from 3,4,8,9-dibenzopyrene-5,10-quinone by having a substantially greater coloring power and a substantially greater fastness to light and to boiling with solutions of soap and soda.

3. The dibromo-3,4,8,9-dibenzopyrene-5,10-quinone which probably contains the bromine atoms in the β- and β'-positions, dyes cotton from a violet red vat substantially more reddish yellow shades than 3,4,8,9-dibenzopyrene-5,10-quinone, dissolves in concentrated sulphuric acid with violet coloration, crystallizes from nitrobenzene in orange red needles, and is distinguished from 3,4,8,9-dibenzopyrene-5,10-quinone by having about twice their coloring power and by its good fastness to light and to boiling with solutions of soap and soda.

4. Tribromo-3,4,8,9-dibenzopyrene-5,10-quinone which dyes cotton from a blue-red vat bright orange shades, dissolves in concentrated sulphuric acid with a blue coloration with a violet tinge, and is distinguished from 3,4,8,9-dibenzopyrene-5,10-quinone by having a substantially greater coloring power and by a substantially greater fastness to light and to boiling with solutions of soap and soda.

5. The process for the production of vat dyestuffs of the dibenzopyrenequinone series, which comprises acting on 3,4,8,9-dibenzopyrene-5,10-quinone in chlorosulphonic acid with a brominating agent in the presence of at least 5 per cent (of the dibenzopyrenequinone) of a halogen-transferring catalyst at between about 60° and about 85° C.

6. The process for the production of vat dyestuffs of the dibenzopyrenequinone series, which comprises acting on 3,4,8,9-dibenzopyrene-5,10-quinone in chlorosulphonic acid with a brominating agent in the presence of at least 5 per cent (of the dibenzopyrenequinone) of iodine at between about 60° and about 85° C.

7. The process for the production of vat dyestuffs of the dibenzopyrenequinone series, which comprises acting on 3,4,8,9-dibenzopyrene-5,10-quinone in chlorosulphonic acid with bromine in the presence of at least 5 per cent (of the dibenzopyrenequinone) of iodine at between about 60° and about 85° C.

8. The process for the production of a vat dyestuff of the dibenzopyrenequinone series, which comprises acting on one molecular proportion of 3,4,8,9-dibenzopyrene-5,10-quinone with 1¼ molecular proportions of bromine in chlorosulphonic acid in the presence of at least 5 per cent (of the dibenzopyrenequinone) of iodine at between about 60° and about 85° C.

9. The process for the production of a vat dyestuff of the dibenzopyrenequinone series, which comprises acting on one molecular proportion of 3,4,8,9-dibenzopyrene-5,10-quinone with 1¼ molecular proportions of bromine in chlorosulphonic acid in the presence of from 5 to 7 per cent (of the dibenzopyrenequinone) of iodine at between about 60° and about 85° C.

10. The process for the production of a vat dyestuff of the dibenzopyrenequinone series, which comprises acting on one molecular proportion of 3,4,8,9-dibenzopyrene-5,10-quinone with 1¼ molecular proportions of bromine in chlorosulphonic acid in the presence of from 5 to 7 per cent (of the dibenzopyrenequinone) of iodine at from 65° to 80° C.

MAX ALBERT KUNZ.
GEORG KRÄNZLEIN.
KARL KOEBERLE.
MARTIN CORELL.
ERICH BERTHOLD.
HEINRICH VOLLMANN.